A. S. LYMAN.
SHEET-METAL CANS FOR PRESERVING FOOD.
No. 195,620.          Patented Sept. 25, 1877.
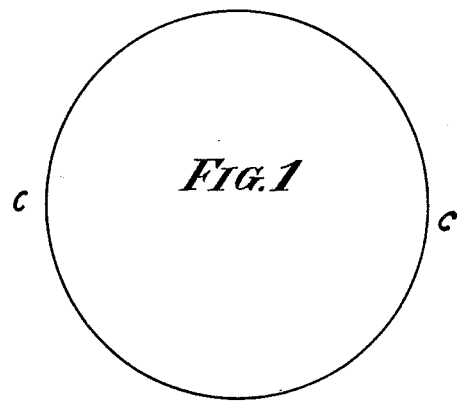
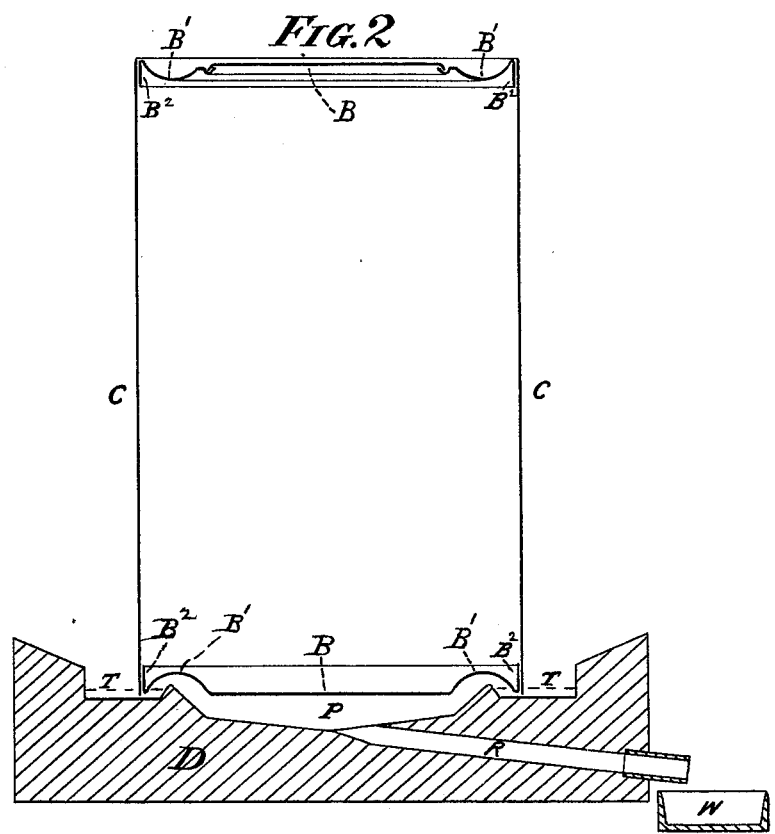
WITNESSES.
E. M. Lyman
Ferd. C. Hahn
INVENTOR.
A. S. Lyman

UNITED STATES PATENT OFFICE.

AZEL S. LYMAN, OF NEW YORK, N. Y., ASSIGNOR TO HIMSELF AND WATTS, PARKER & CO., OF SAME PLACE.

IMPROVEMENT IN SHEET-METAL CANS FOR PRESERVING FOOD.

Specification forming part of Letters Patent No. 195,620, dated September 25, 1877; application filed April 24, 1877.

*To all whom it may concern:*

Be it known that I, AZEL S. LYMAN, of the city, county, and State of New York, have invented a Sheet-Metal Can for Preserving Food, of which the following is a specification:

The object of my invention is to attain a form of can eminently strong, capable of being easily produced by dies, and adapted to allow of soldering by dipping without touching any part to the solder except the very edge of the joint.

The accompanying drawing shows the can, and also a peculiar construction of soldering apparatus, for which my can is especially adapted, and which I believe it proper to fully describe in this connection so far as the form of the soldering apparatus appears to be related to this case.

I do not in this patent claim the soldering apparatus, proposing to make that the subject of a separate patent.

Referring to the drawings, similar letters refer to like parts.

Figure 1 shows a cross-section, and Fig. 2 a vertical central section, of the can, representing it as standing on the soldering-block D, with its lower head in process of being soldered into the sides.

The side seam of the body C being first soldered from the outside, it is driven down over the flanges B² of the head, so as to bind it. It is then left to stand a few seconds, with the joint partially immersed in hot tallow or other suitable flux; then in the melted solder which is contained in the shallow circular groove T surrounding the sink P, into which the central portion of the projecting bottom of the can extends, and from the bottom of which the descending conduit R conducts any solder that runs over into the outer reservoir W. This conduit also permits the air to flow freely back and forth, and thus prevents a partial vacuum under the can when it is lifted out of the solder.

It will be observed not only that the ends are inserted with their flanges inward or toward the center of the length of the can, but that a sunk bead or continuous depression is formed in each, and quite around close to the flange B², as denoted by B¹, and that within this depression B¹ is a considerable area of plane metal, B. This plane area is in a separate piece at the upper head, for obvious reasons; but in each end it stands about in the plane of the extreme rim or periphery of the end of the can, so that when the filled can stands on either end the plane central portion bears on the table or other plane support. I esteem this an important feature; but the depression B¹ is still more important. It adapts the can to be immersed along the edge by being dipped in a suitably-shaped vessel of solder, without any solder touching or any way deforming the central portion of the end.

The upper end of the can, containing the opening for filling it, is generally soldered first, and, as both heads are soldered by this mode, no particular mechanical skill is required to solder the heads in firm and tight; and as the flanges of the heads extend above the level of the solder, (shown by the dotted line,) this solder, a large portion of which is lead, cannot enter the can. It is forced by gravity up but a small distance between the side and flange. Capillary attraction carries it the remainder of the way, but never over into the can.

When a proper flux is used, and it is allowed to stand for half a minute in the solder at a proper temperature, a very strong tight joint is made.

One boy, with five or six of these soldering-blocks kept properly heated, will solder in eight or ten heads per minute, allowing each to stand in the hot solder about half a minute. He merely places them in the solder and removes them. They are soldered by gravity and capillary attraction. Very little solder remains, except that which is held by capillary attraction between the surfaces, where it is needed, and less solder is required by this mold than when soldered as ordinarily by the tinman's copper.

It would be impracticable, and I believe impossible, for a skilled workman to solder one can in a day, when put together in this manner, as perfectly with the ordinary soldering-copper as it is soldered in a minute by this mode, because, first, if it is soldered in by the tinman's copper, it is highly heated in but one part at a time, and when the soldering is completed some parts are under a severe strain, and the can will not stand so much pressure as when soldered by this mode; second, if with his copper he soldered the whole depth of the flange, the solder would run through into the can in some places, while by this mode it is carried by capillary attraction just as far as it is wanted, and no farther—never into the can.

By reason of the well-defined angle between the recess $B^1$ and the plane central portion B the effect of a corrugation is obtained to greatly stiffen the structure.

I claim as my invention—

A sheet-metal can for preserving food, having ends formed as shown, with the flange $B^2$ extending inward, the recess $B^1$ extending around, and the flat central portion B, in combination with the body C, as herein specified.

A. S. LYMAN.

Witnesses:
E. M. LYMAN,
FERD. C. HAHN.